US010654999B2

(12) United States Patent
Galvan et al.

(10) Patent No.: US 10,654,999 B2
(45) Date of Patent: *May 19, 2020

(54) FILM COMPRISING A POLYOLEFIN COMPOSITION

(71) Applicant: BASELL POLIOLEFINE ITALIA S.R.L., Milan (IT)

(72) Inventors: Monica Galvan, Ferrara (IT); Gianni Perdomi, Ferrara (IT); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 43 days.

This patent is subject to a terminal disclaimer.

(21) Appl. No.: 16/300,634

(22) PCT Filed: May 9, 2017

(86) PCT No.: PCT/EP2017/060996
§ 371 (c)(1),
(2) Date: Nov. 12, 2018

(87) PCT Pub. No.: WO2017/202600
PCT Pub. Date: Nov. 30, 2017

(65) Prior Publication Data
US 2019/0284383 A1 Sep. 19, 2019

(30) Foreign Application Priority Data
May 25, 2016 (EP) ..................... 16171218

(51) Int. Cl.
C08L 23/16 (2006.01)
C08L 23/08 (2006.01)
C08L 23/12 (2006.01)
C08L 23/10 (2006.01)

(52) U.S. Cl.
CPC ........... *C08L 23/16* (2013.01); *C08L 23/0815* (2013.01); *C08L 23/10* (2013.01); *C08L 23/12* (2013.01); *C08L 2201/10* (2013.01); *C08L 2203/16* (2013.01); *C08L 2205/02* (2013.01); *C08L 2205/03* (2013.01)

(58) Field of Classification Search
CPC ...... C08L 23/10; C08L 23/16; C08L 2205/02; C08L 2205/03; C08L 2203/16
See application file for complete search history.

(56) References Cited

U.S. PATENT DOCUMENTS

| | | | | |
|---|---|---|---|---|
| 5,453,466 A * | 9/1995 | Pellegatti | ................ | C08L 23/12 525/240 |
| 7,125,924 B2 * | 10/2006 | Credali | ................... | C08L 23/10 524/425 |
| 7,981,982 B2 * | 7/2011 | Cagnani | ................ | C08F 210/16 526/64 |
| 10,501,616 B2 * | 12/2019 | Galvan | ................... | C08L 23/10 |
| 2004/0041299 A1 * | 3/2004 | Kim | ........................... | C08J 5/18 264/176.1 |
| 2015/0166778 A1 * | 6/2015 | Fantinel | .............. | C08L 23/0815 428/36.9 |
| 2015/0232643 A1 * | 8/2015 | Herklots | ................. | B29C 43/00 264/523 |
| 2016/0347941 A1 * | 12/2016 | Nakajima | ............ | C08K 5/0083 |
| 2019/0160795 A1 * | 5/2019 | Galvan | ................... | B32B 27/08 |

FOREIGN PATENT DOCUMENTS

| | | | | |
|---|---|---|---|---|
| EP | 2540499 A1 * | 1/2013 | ............. | B32B 27/34 |
| WO | WO-2006062956 A2 * | 6/2006 | ............. | C08F 10/00 |
| WO | 2012093099 A1 | 7/2012 | | |
| WO | 2015161398 A1 | 10/2015 | | |

OTHER PUBLICATIONS

PCT International Search Report and the Written Opinion dated Jun. 2, 2017 (Jun. 2, 2017) for Corresponding PCT/EP2017/060996.

* cited by examiner

Primary Examiner — Michael M Dollinger

(57) ABSTRACT

The disclosure provides a film made from or containing a polyolefin composition made from or containing A) 5-35% by weight, based upon the total weight of the polyolefin composition, of a propylene homopolymer or a propylene ethylene copolymer;

B) 25-50% by weight, based upon the total weight of the polyolefin composition, of a copolymer of ethylene and a $C_3$-$C_8$ alpha-olefin containing from 0.1% to 20% by weight of alpha-olefin units; and C) 30-60% by weight, based upon the total weight of the polyolefin composition, of a copolymer of ethylene and propylene containing from 25% to 75% by weight of ethylene units.

15 Claims, No Drawings

FILM COMPRISING A POLYOLEFIN COMPOSITION

This application is the U.S. National Phase of PCT International Application PCT/EP2017/060996, filed May 9, 2017, claiming benefit of priority to European Patent Application No. 16171218.7, filed May 25, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to films made from or containing a polyolefin blend containing propylene based polymers and LLDPE.

BACKGROUND OF THE INVENTION

Films made of propylene copolymers or terpolymers are useful for certain applications.

SUMMARY OF THE INVENTION

The present disclosure provides a composition made from or containing propylene-base polymers and LLDPE. In some embodiments, the composition is used for the production of films. In some embodiments, the films are cast or blown or bioriented films. In some embodiments, the films have improved optical properties.

In some embodiments, the present disclosure provides a film made from or containing a polyolefin composition made from or containing A) 5-35% by weight, based upon the total weight of the polyolefin composition, of a propylene homopolymer containing 5% by weight or less of a fraction soluble in xylene at 25° C. ($XS_A$), or a propylene ethylene copolymer containing 90% by weight or more of propylene units; containing 10% by weight or less of a fraction soluble in xylene at 25° C. ($XS_A$), both the amount of propylene units and of the fraction $XS_A$ being referred to the weight of A);

B) 20-50% by weight, based upon the total weight of the polyolefin composition, of a copolymer of ethylene and a $C_3$-$C_8$ alpha-olefin containing from 0.1% to 20% by weight of alpha-olefin units and containing 25% by weight or less; of a fraction soluble in xylene at 25° C. ($XS_B$), both the amount of alpha-olefin units and of the fraction $XS_B$ being referred to the weight of (B); and C) 30-60% by weight, based upon the total weight of the polyolefin composition, of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C), wherein the amounts of (A), (B) and (C) being referred to the total weight of (A)+(B)+(C) and the sum of the amount of (A)+(B)+(C) being 100.

DETAILED DESCRIPTION OF THE INVENTION

In some embodiments, the present disclosure provides a film made from or containing a polyolefin composition made from or containing:

A) 5-35% by weight, based upon the total weight of the polyolefin composition; alternatively 10-30% by weight; alternatively 15-25% by weight, of a propylene homopolymer containing 5% by weight or less of a fraction soluble in xylene at 25° C. ($XS_A$), or a propylene ethylene copolymer containing 90% by weight or more, alternatively 95% by weight or more; alternatively 97% by weight or more, of propylene units; containing 10% by weight or less, alternatively 5% by weight or less, of a fraction soluble in xylene at 25° C. ($XS_A$), both the amount of propylene units and of the fraction $XS_A$ being referred to the weight of A);

B) 20-50% by weight, based upon the total weight of the polyolefin composition; alternatively 25-45% by weight; alternatively 30-40% by weight, of a copolymer of ethylene and a $C_3$-$C_8$ alpha-olefin containing from 0.1% to 20% by weight; alternatively from 5% to 15% by weight; alternatively from 7% to 12% by weight of alpha-olefin units and containing 25% by weight or less; alternatively from 20% by weight or less; alternatively 17% by weight or less of a fraction soluble in xylene at 25° C. ($XS_B$), both the amount of alpha-olefin units and of the fraction $XS_B$ being referred to the weight of (B); and C) 30-60% by weight, based upon the total weight of the polyolefin composition; alternatively 35-55% by weight; alternatively 40-50% by weight of a copolymer of ethylene and propylene containing from 25% to 75% by weight; alternatively from 37% to 65% by weight; alternatively from 45% to 58% by weight of ethylene units and containing from 40% to 95% by weight of a fraction soluble in xylene at 25° C. ($XS_C$), both the amount of ethylene units and of the fraction $XS_C$ being referred to the weight of (C), wherein the amounts of (A), (B) and (C) being referred to the total weight of (A)+(B)+(C) and the sum of the amount of (A)+(B)+(C) being 100.

In some embodiments, Component (A) has a melt flow rate (230° C./2.16 kg) ranging between 50 and 200 g/10 min; alternatively between 80 and 170 g/10 min.

In some embodiments, Components (A)+(B) blended together have a melt flow rate (230° C./2.16 kg) between 0.1 and 70 g/10 min. alternatively between 1 and 50 g/10 min; alternatively between 8 and 40 g/10 min.

In some embodiments, Component B) has a density (determined according to ISO 1183 at 23° C.) of from 0.940 to 0.965 g/cm³. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene. In some embodiments, the alpha-olefin comonomers are selected from the group consisting of 1-butene 1-hexene and 1-octene. In some embodiments, the alpha-olefin comonomer is 1-butene.

In some embodiments, the polyolefin composition has a melt flow rate (230° C./2.16 kg) between 0.5 to 25 g/10 min, alternatively from 0.8 to 20.0 g/10 min; alternatively from 1.0 to 18.0 g/10 min.

In some embodiments, the polyolefin composition has an intrinsic viscosity [η] (measured in tetrahydronaphthalene at 135° C.) of the xylene soluble fraction at 25° C. between 1.5 to 4.0 dl/g, alternatively between 2.0 and 3.5 dl/g; alternatively between 2.1 and 2.8 dl/g.

As used herein, the term "copolymer" refers to polymers containing two kinds of comonomers such as propylene and ethylene or ethylene and 1-butene.

In some embodiments, the polyolefin composition is used in the production of films. In some embodiments, the polyolefin composition is used to prepare a film selected from the group consisting of cast film, blown film and biaxially oriented films.

In some embodiments, the polyolefin composition is prepared by a sequential polymerization, including three sequential steps, wherein components (A), (B) and (C) are prepared in separate subsequent steps, operating in each step, except the first step, in the presence of the polymer formed and the catalyst used in the preceding step. The catalyst is added in the first step. In some embodiments, the catalyst's activity is such that the catalyst is active for the subsequent steps.

In some embodiments, the polymerization is selected from continuous or batch processes. In some embodiments, the polymerization is carried out in a process operating in liquid phase. In some embodiments, the polymerization is carried out in the presence of inert diluent. In some embodiments, the polymerization is carried out in the absence of inert diluent. In some embodiments, the polymerization is carried out in a process operating in gas phase. In some embodiments, the polymerization is carried out in a process operating with mixed liquid-gas techniques.

In some embodiments, reaction time, pressure and temperature relative to the polymerization steps are not critical. In some embodiments, the reaction temperature is from 50 to 100° C. In some embodiments, the reaction pressure is atmospheric or higher.

In some embodiments, the regulation of the molecular weight is carried out by using regulators. In some embodiments, the regulator is hydrogen.

In some embodiments, the polymerizations are carried out in the presence of a Ziegler-Nana catalyst. In some embodiments, the Ziegler-Natta catalyst is made from or contains the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from compounds of Ti, V, Zr, Cr and Hf. In some embodiments, the transition metal compound is supported on $MgCl_2$.

In some embodiments, the catalysts are made from or contain the product of the reaction of the organometallic compound of group 1, 2 or 13 of the Periodic Table of elements, with a solid catalyst component made from or containing a Ti compound and an electron donor compound supported on MgCl2.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on MgCl2, alternatively a Ziegler-Natta catalyst made from or containing the product of reaction of:
1) a solid catalyst component made from or containing a Ti compound and an electron donor (internal electron-donor) supported on MgCl2;
2) an aluminum alkyl compound (cocatalyst); and, optionally,
3) an electron-donor compound (external electron-donor).

In some embodiments, the solid catalyst component (1) contains, as an electron-donor, a compound selected among ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977, both incorporated herein by reference.

In some embodiments, the electron-donor compounds are selected from the group consisting of phthalic acid esters and succinic acid esters. In some embodiments, the electron-donor is diisobutyl phthalate.

In some embodiments, the succinic acid esters are represented by the formula (I):

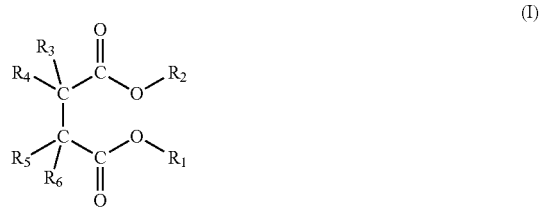

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

In some embodiments, R1 and R2 are selected from the group consisting of C1-C8 alkyl, cycloalkyl, aryl, arylalkyl and alkylaryl groups. In some embodiments, R1 and R2 are selected from primary alkyls, alternatively branched primary alkyls. In some embodiments, R1 and R2 groups are selected from the group consisting of methyl, ethyl, n-propyl, n-butyl, isobutyl, neopentyl, and 2-ethylhexyl. In some embodiments, R1 and R2 groups are selected from the group consisting of ethyl, isobutyl, and neopentyl.

In some embodiments, R3 to R5 are hydrogen and R6 is a branched alkyl, cycloalkyl, aryl, arylalkyl and alkylaryl radical having from 3 to 10 carbon atoms. In some embodiments, at least two radicals from R3 to R6 are different from hydrogen and are selected from C1-C20 linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms are (a) R3 and R5 or (b) R4 and R6.

In some embodiments, other electron-donors are the 1,3-diethers as described in published European Patent Application Nos. EP-A-361 493 and 728769, incorporated herein by reference.

In some embodiments, cocatalysts (2) are selected from trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula R1aR2bSi(OR3)c, where a and b are integer numbers from 0 to 2, c is an integer from 1 to 3 and the sum (a+b+c) is 4; R1, R2 and R3 are alkyl, cycloalkyl or aryl radicals with 1-18 carbon atoms optionally containing heteroatoms.

In some embodiments, the silicon compounds are selected from the group consisting of (tert-butyl)2Si(OCH3)2, (cyclohexyl)(methyl)Si(OCH3)2, (phenyl)2Si(OCH3)2 and (cyclopentyl)2Si(OCH3)2.

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thus producing a quantity of polymer from 0.5 to 3 times the weight of the catalyst.

In some embodiments, the operation takes place in liquid monomer, producing a quantity of polymer up to 1000 times the weight of the catalyst.

The following examples are given to illustrate and not limit the present disclosure.

EXAMPLES

Characterizations

Xylene-Soluble Faction at 25° C. (XS or Xs)

The Xylene Soluble fraction was measured according to ISO 16152, 2005, but with the following deviations (between parentheses).

The solution volume was 250 ml (200 ml);

During the precipitation stage at 25° C. for 30 min, the solution, for the final 10 minutes, was kept under agitation by a magnetic stirrer (30 min, without any stirring at all);

The final drying step was done under vacuum at 70° C. (100° C.);

The content of the xylene-soluble fraction was expressed as a percentage of the original 2.5 grams and then, by difference (complementary to 100), the xylene unsoluble %;

XS of components B) and C) have been calculated by using the formula;

$$XS_{tot} = WaXS_A + WbXS_B + WcXS_C$$

wherein Wa, Wb and We are the relative amounts of components A, B and C (A+B+C=1)

Melt Flow Rate (MFR)

Measured according to ISO 1133 at 230° C. with a load of 2.16 kg, unless otherwise specified.

Intrinsic Viscosity IV

The sample was dissolved in tetrahydronaphthalene at 135° C. and then poured into the capillary viscometer. The viscometer tube (Ubbelohde type) was surrounded by a cylindrical glass jacket; this setup allowed temperature control with a circulating thermostated liquid. The downward passage of the meniscus was timed by a photoelectric device.

The passage of the meniscus in front of the upper lamp started the counter which had a quartz crystal oscillator. The meniscus stopped the counter as the meniscus passed the lower lamp and the efflux time was registered: the efflux time was converted into a value of intrinsic viscosity through Huggins' equation (Huggins, M. L., J. Am. Chem. Soc., 1942, 64, 2716, incorporated herein by reference) using the flow time of the pure solvent at the same experimental conditions (same viscometer and same temperature). A single polymer solution was used to determine $[\eta]$.

Comonomer (C2 and C4) Content

Comonomer ($C_2$ and $C_4$) content

The content of comonomers was determined by infrared spectroscopy by collecting the IR spectrum of the sample vs. an air background with a Fourier Transform Infrared spectrometer (FTIR). The instrument data acquisition parameters were:

purge time: 30 seconds minimum
collect time: 3 minutes minimum
apodization: Happ-Genzel
resolution: 2 $cm^{-1}$.

Sample Preparation—

Using a hydraulic press, a thick sheet was obtained by compression molding about 1 g of sample between two aluminum foils. A small portion was cut from the sheet to mold a film. The film thickness was set to have a maximum absorbance of the $CH_2$ absorption band recorded at ~720 $cm^{-1}$ of 1.3 a.u. (% Transmittance >5%). Molding conditions were 180±10° C. (356° F.) and pressure was around 10 $kg/cm^2$ (142.2 PSI) for about one minute. The pressure was released. The sample was removed from the press and cooled to room temperature. The spectrum of pressed film sample was recorded in absorbance vs. wavenumbers ($cm^{-1}$). The following measurements were used to calculate ethylene ($C_2$) and 1-butene ($C_4$) contents:

a) Area ($A_t$) of the combination absorption bands between 4482 and 3950 $cm^{-1}$ which was used for spectrometric normalization of film thickness.

b) Area ($A_{C2}$) of the absorption band due to methylenic sequences ($CH_2$ rocking vibration) in the range 660 to 790 $cm^{-1}$ after a proper digital subtraction of an isotactic polypropylene (IPP) and a $C_2C_4$ references spectrum.

c) The factor of subtraction ($FCR_{C4}$) between the spectrum of the polymer sample and the $C_2C_4$ reference spectrum. The reference spectrum was obtained by digital subtraction of a linear polyethylene from a $C_2C_4$ copolymer, to extract the $C_4$ band (ethyl group at ~771 cm-1).

The ratio $A_{C2}/A_t$ was calibrated by analyzing ethylene-propylene standard copolymers of reference compositions, determined by NMR spectroscopy.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150, incorporated herein by reference).

To calculate the ethylene ($C_2$) and 1-butene ($C_4$) content, calibration curves were obtained by using reference samples with ethylene and 1-butene detected by $^{13}$C-NMR.

Calibration for ethylene—A calibration curve was obtained by plotting $A_{C2}/A_t$ versus ethylene molar percent (% C2 m), and the coefficient $a_{C2}$, $b_{C2}$ and $c_{C2}$ then calculated from a "linear regression".

Calibration for 1-butene—A calibration curve was obtained by plotting $FCR_{C4}/A_t$ versus butane molar percent (% C4 m) and the coefficients $a_{C4}$, $b_{C4}$ and $C_{C4}$ then calculated from a "linear regression".

The spectra of the evaluated samples were recorded and then ($A_t$), ($A_{C2}$) and ($FCR_{C4}$) were calculated.

The ethylene content (% molar fraction C2 m) of the sample was calculated as follows:

$$\% \ C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction C4 m) of the sample was calculated as follows:

$$\% \; C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

$a_{C4}$, $b_{C4}$, $c_{C4}$ $a_{C2}$, $b_{C2}$, $c_{C2}$ are the coefficients of the two calibrations.

Changes from mol % to wt % were calculated by using molecular weights.

Amount (wt %) of comonomer of components A-C were calculated by using the relation;

$$Com_{tot} = WaCom_A + WbCom_B + WcCom_C$$

wherein Wa, Wb and Wc are the relative amount of components A, B and C (A+B+C=1)

Comtot, ComA, ComB, ComC are the amounts of comonomer in the composition (tot) and in components A-C.

Determination of the Haze

Films with a thickness of 50 μm were prepared by extruding each test composition in a single screw Collin extruder (length/diameter ratio of screw 1:25) at a film drawing speed of 7 m/min and a melt temperature of 210-250° C.

50 μm film specimens used. The haze value was measured using a Gardner photometric unit connected to a Hazemeter type UX-10 or an equivalent instrument having G.E. 1209 light source with filter "C". Reference samples were used for calibrating the instrument.

Examples 1—Preparation of Polyolefin Composition

Catalyst Precursor

The solid catalyst component used in polymerization was a Ziegler-Natta catalyst component supported on magnesium chloride, containing titanium and diisobutylphthalate as internal donor. An initial amount of microspheroidal MgCl2.2.8C2H5OH was prepared according to the method described in Example 2 of U.S. Pat. No. 4,399,054, incorporated herein by reference, but operating at 3,000 rpm instead of 10,000. The adduct was subjected to thermal dealcoholation at increasing temperatures from 30 to 130° C., operating in nitrogen current until the molar alcohol content per mol of Mg was 1.16. Into a 1000 mL four-necked round flask, purged with nitrogen, 500 mL of TiCl4 were introduced at 0° C. While stirring, 30 grams of the microspheroidal MgCl2.1.16C2H5OH adduct were added. The temperature was raised to 120° C. and kept for 60 minutes. During the temperature increase, an amount of diisobutylphthalate was added such as to have a Mg/diisobutylphthalate molar ratio of 18. After the 60 minutes, stirring was stopped, the liquid was siphoned off, and the treatment with TiCl4 was repeated at 100° C. for 1 hour in the presence of an amount of diisobutylphthalate such as to have a Mg/diisobutylphthalate molar ratio of 27. After that time the stirring was stopped, the liquid was siphoned off, and the treatment with TiCl4 was repeated at 100° C. for 30 min. After sedimentation and siphoning at 85° C., the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio be equal to 4.

The catalyst system was subjected to prepolymerization by maintaining the catalyst system in suspension in liquid propylene at 50° C. for about 75 minutes before introducing the catalyst system into the first polymerization reactor.

Polymerization

The polymerization was carried out in a continuous series of three gas-phase reactors equipped with devices to transfer the product from the first reactor to the second one. Into the first gas phase polymerization reactor, a propylene-based polymer (A) was produced by feeding in a continuous and constant flow, the prepolymerized catalyst system, hydrogen (used as molecular weight regulator) and propylene, in a gas state. The propylene-based polymer (A) coming from the first reactor was discharged in a continuous flow and, after having been purged of unreacted monomers, was introduced, in a continuous flow, into the second gas phase reactor, together with quantitatively constant flows of hydrogen and ethylene, in a gas state. In the second reactor a copolymer of ethylene (B) was produced. The product coming from the second reactor was discharged in a continuous flow and, after having been purged of unreacted monomers, was introduced, in a continuous flow, into the third gas phase reactor, together with quantitatively constant flows of hydrogen, ethylene and propylene, in a gas state. In the third reactor an ethylene-propylene polymer (C) was produced. Polymerization conditions, molar ratio of the reactants and composition of the copolymers obtained are shown in Table 1. The polymer particles exiting the third reactor were subjected to a steam treatment to remove the reactive monomers and volatile substances, and then dried. Thereafter the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;

Extruder output: 15 kg/hour;

Melt temperature: 245° C.

The stabilizing additive composition was made of the following components:

0.1% by weight of Irganox® 1010;

0.1% by weight of Irgafos® 168;

0.04% by weight of DHT-4A (hydrotalcite);

the percent amounts being referred to the total weight of the polymer and stabilizing additive composition.

The Irganox® 1010 was 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate, while Irgafos® 168 was tris(2,4-di-tert.-butylphenyl)phosphite. The characteristics relating to the polymer composition, reported in Table 2, were obtained from measurements carried out on the extruded polymer, which constituted the stabilized ethylene polymer composition.

TABLE 1

Polymerization conditions

| | | Example 1 |
|---|---|---|
| 1st Reactor - component (A) | | |
| Temperature | °C. | 60 |
| Pressure | barg | 16 |
| $H_2/C_3$— | mol. | 0.24 |
| Split | wt % | 22 |
| Xylene soluble of (A) ($XS_A$) | wt % | 4.2 |
| MFR of (A) | g/10 min. | 110 |
| 2nd Reactor - component (B) | | |
| Temperature | °C. | 80 |
| Pressure | barg | 18 |
| $H_2/C_2$— | mol. | 0.81 |
| $C_4$—/($C_2$— + $C_4$—) | mol. | 0.25 |
| $C_2$—/($C_2$— + $C_3$—) | mol. | 0.98 |
| Split | wt % | 32 |
| $C_2$— content of B * | wt % | 90 |
| $C_4$— content of B * | wt % | 10 |
| Xylene soluble of B ($XS_B$) * | wt % | 16.0 |
| Xylene soluble of (A + B) | wt % | 12.0 |
| MFR of (A + B) | g/10 min | 35.9 |
| 3rd Reactor - component (C) | | |
| Temperature | °C. | 65 |
| Pressure | barg | 18 |
| $H_2/C_2$— | mol. | 0.17 |
| $C_2$—/($C_2$— + $C_3$—) | mol. | 0.42 |
| Split | wt % | 46 |
| $C_2$— content of C * | wt % | 52 |
| Xylene soluble of (C) ($XS_C$) * | wt % | 83 |

Notes:
$C_2$— = ethylene (IR); $C_3$— = propylene (IR); $C_4$— = 1-butene (IR); split = amount of polymer produced in the concerned reactor.
* Calculated values.

Comparative Example 2

Comparative example 2 was an heterophasic polymer comprising a propylene ethylene matrix and a two propylene ethylene rubber phases Component C containing 19.5 wt % of ethylene derived units.

The feature of the polymer of example 1 and comparative example 2 are reported in Table 2.

TABLE 2

| | | Example | |
|---|---|---|---|
| | | 1 | comp 2 |
| component A | | | |
| C2 content | wt % | 0 | 3.5 |
| XSA | wt % | 4.2 | <6.5 |
| MFR | g/10 min | 110 | 25 |
| split | wt % | 22 | 31.8 |
| component B | | | |
| XSB* | wt % | 16 | 5.5 |
| C2 content* | wt % | 90.0 | 16 |
| C4 content* | wt % | 10.0 | np |
| split | wt % | 32 | 39.5 |
| MFR of (A + B) | g/10 min | 35.9 | 1.2 |
| Component C | | | |
| XSC* | wt % | 83 | 64 |
| C2 content* | wt % | 52 | 19.5 |
| split | wt % | 446 | 28.7 |
| total composition | | | |
| MFR | g/10 min | 1.61 | 2.5 |
| IV on soluble in Xylene | dl/g | 2.4 | 3.2 |

C2 ethylene;
C4 1-butene;
*calculated

The polymers of example 1 and comparative example 2 were used to produce cast film of 50 micron thickness. The films were analyzed and the results are reported in Table 3.

TABLE 3

| | | example | |
|---|---|---|---|
| | | 1 | comp 2 |
| haze | % | 18.3 | 55 |
| MET (MD) | N/mm² | 235 | 77 |
| Gels >2.5 mm | nr/m² | 0 | 0 |
| Gels 1.5-2.5 mm | nr/m² | 0 | 0 |
| Gels 0.7-1.5 mm | nr/m² | 0 | 1 |
| Gels 0.5-0.7 mm | nr/m² | 2 | 3 |

What is claimed is:

1. A film comprising:
   a polyolefin composition comprising:
   A) 5-30% by weight, based upon the total weight of the polyolefin composition, of a propylene homopolymer containing 5% by weight or less of a fraction soluble in xylene at 25° C. ($XS_A$), or a propylene ethylene copolymer containing 90% by weight or more of propylene units; containing 10% by weight or less of a fraction soluble in xylene at 25° C. ($XS_A$), both the amount of propylene units and of the fraction $XS_A$ being referred to the weight of A);
   B) 20-50% by weight, based upon the total weight of the polyolefin composition; of a copolymer of ethylene and a $C_3$-$C_8$ alpha-olefin containing from 0.1% to 20% by weight of alpha-olefin units and containing 25% by weight or less of a fraction soluble in xylene at 25° C. ($XS_B$), both the amount of alpha-olefin units and of the fraction $XS_B$ being referred to the weight of (B); and
   C) 30-60% by weight, based upon the total weight of the polyolefin composition, of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C),
   wherein the amounts of (A), (B) and (C) being referred to the total weight of (A)+(B)+(C) and the sum of the amount of (A)+(B)+(C) being 100.

2. The film according to claim 1, wherein
   Component A ranges from 10% by weight to 30% by weight;
   Component B ranges from 25% by weight to 45% by weight; and
   Component C ranges from 35% by weight to 55% by weight.

3. The film according to claim 1, wherein
   Component A ranges from 15% by weight to 25% by weight;
   Component B ranges from 30% by weight to 40% by weight; and Component C ranges from 40% by weight to 50% by weight.

4. The film according to claim 1, wherein Component (A) is a propylene homopolymer.

5. The film according to claim 1 wherein in Component (A) is a propylene ethylene copolymer containing 90% by weight or more of propylene units and contains 5% by weight or less of a fraction soluble in xylene at 25° C. ($XS_A$).

6. The film according to claim 1, wherein Component (B) is a copolymer of ethylene and a $C_3$-$C_8$ alpha-olefin containing from 5% to 15% by weight of alpha-olefin units.

7. The film according to claim 1, wherein Component (C) is a copolymer of ethylene and propylene containing from 37% to 65% by weight of ethylene units.

8. The film according to claim 1, wherein Component (A) has a melt flow rate at 230° C./2.16 kg ranging between 50 and 200 g/10 min.

9. The film according to claim 1, wherein Components (A)+(B) blended together have a melt flow rate at 230° C./2.16 kg ranging between 0.1 and 70 g/10 min.

10. The film according to claim 1, wherein the polyolefin composition has a melt flow rate at 230° C./2.16 kg between 0.5 to 25 g/10 min.

11. The film according to claim 1, wherein the polyolefin composition has an intrinsic viscosity [$\eta$], measured in tetrahydronaphthalene at 135° C., of the xylene soluble fraction at 25° C. between 1.5 to 4.0 dl/g.

12. The film according to claim 1, wherein the polyolefin composition has an intrinsic viscosity [$\eta$], measured in tetrahydronaphthalene at 135° C., of the xylene soluble fraction at 25° C. between 2.0 to 3.5 dl/g.

13. The film according to claim 1, being a cast film.

14. The film according to claim 1, being a biaxially oriented film.

15. The film according to claim 1, being a blown film.

* * * * *

UNITED STATES PATENT AND TRADEMARK OFFICE
CERTIFICATE OF CORRECTION

| | | |
|---|---|---|
| PATENT NO. | : 10,654,999 B2 | |
| APPLICATION NO. | : 16/300634 | |
| DATED | : May 19, 2020 | |
| INVENTOR(S) | : Galvan et al. | |

It is certified that error appears in the above-identified patent and that said Letters Patent is hereby corrected as shown below:

On the Title Page

Item (30), Line 1, delete "16171218" and insert -- 16171218.7 --, therefor

In the Claims

In Column 11, Claim 5, Line 5, after "wherein" delete "in"

Signed and Sealed this
Fifteenth Day of November, 2022

Katherine Kelly Vidal
*Director of the United States Patent and Trademark Office*